United States Patent
Ballantine et al.

(10) Patent No.: US 12,292,749 B2
(45) Date of Patent: May 6, 2025

(54) MULTIPLE OUTPUT HEADER

(71) Applicant: Ohmium International, Inc., Incline Village, NV (US)

(72) Inventors: Arne Ballantine, Incline Village, NV (US); Chockkalingam Karuppaiah, Fremont, CA (US); Rasool Aghatehrani, Redwood City, CA (US); Roby Worster, Reno, NV (US); Celeste Mueller, Missoula, MT (US)

(73) Assignee: Ohmium International, Inc., Newark, CA (US)

( * ) Notice: Subject to any disclaimer, the term of this patent is extended or adjusted under 35 U.S.C. 154(b) by 215 days.

(21) Appl. No.: 17/842,241

(22) Filed: Jun. 16, 2022

(65) Prior Publication Data

US 2022/0404846 A1    Dec. 22, 2022

Related U.S. Application Data

(60) Provisional application No. 63/211,858, filed on Jun. 17, 2021.

(30) Foreign Application Priority Data

Jun. 10, 2022   (TW) .................................. 111121693

(51) Int. Cl.
*B01J 4/00*     (2006.01)
*C01B 3/34*    (2006.01)
*C25B 1/02*    (2006.01)
*G05D 16/20*  (2006.01)

(52) U.S. Cl.
CPC ............ *G05D 16/204* (2013.01); *B01J 4/001* (2013.01); *C01B 3/34* (2013.01); *C25B 1/02* (2013.01); *B01J 2204/005* (2013.01); *C01B 2203/0233* (2013.01); *C01B 2203/1241* (2013.01)

(58) Field of Classification Search
CPC .................. G05D 116/204; C01B 3/34; C01B 2203/0233; C01B 2203/1241; C25B 1/02
See application file for complete search history.

(56) References Cited

U.S. PATENT DOCUMENTS 6,745,105 B1 * 6/2004 Fairlie ....................... C01B 3/32
                                                                    205/637
7,112,891 B2   9/2006 Johnson et al.
(Continued)

FOREIGN PATENT DOCUMENTS

EP            4356461 A1    4/2024
JP        2024523381 A      6/2024
(Continued)

OTHER PUBLICATIONS

PCT Application No. PCT/US22/33815, International Search Report and Written Opinion mailed Nov. 7, 2022.

*Primary Examiner* — Jason K Niesz
(74) *Attorney, Agent, or Firm* — Polsinelli LLP

(57) ABSTRACT

Provided herein are systems and methods for generating gas and delivering the gas at multiple output pressures. The system includes a plurality of gas generators and a plurality of applications, each application having a different header pressure. A plurality of header valves directs the gas flow to the plurality of applications such that energy loss is minimized.

23 Claims, 1 Drawing Sheet

(56) References Cited

U.S. PATENT DOCUMENTS

| | | | |
|---|---|---|---|
| 7,216,040 B2 * | 5/2007 | Copeman | C01B 3/00 |
| | | | 141/98 |
| 8,669,499 B2 | 3/2014 | Conrad | |
| 2005/0056661 A1 | 3/2005 | Casamatta et al. | |
| 2006/0038533 A1 | 2/2006 | Johnson et al. | |
| 2006/0229827 A1 | 10/2006 | Copeman et al. | |
| 2010/0068132 A1 | 3/2010 | Vencill et al. | |

FOREIGN PATENT DOCUMENTS

| | | |
|---|---|---|
| TW | 202337556 A | 10/2023 |
| WO | 2018236649 A1 | 12/2018 |
| WO | 2022266337 A1 | 12/2022 |

\* cited by examiner

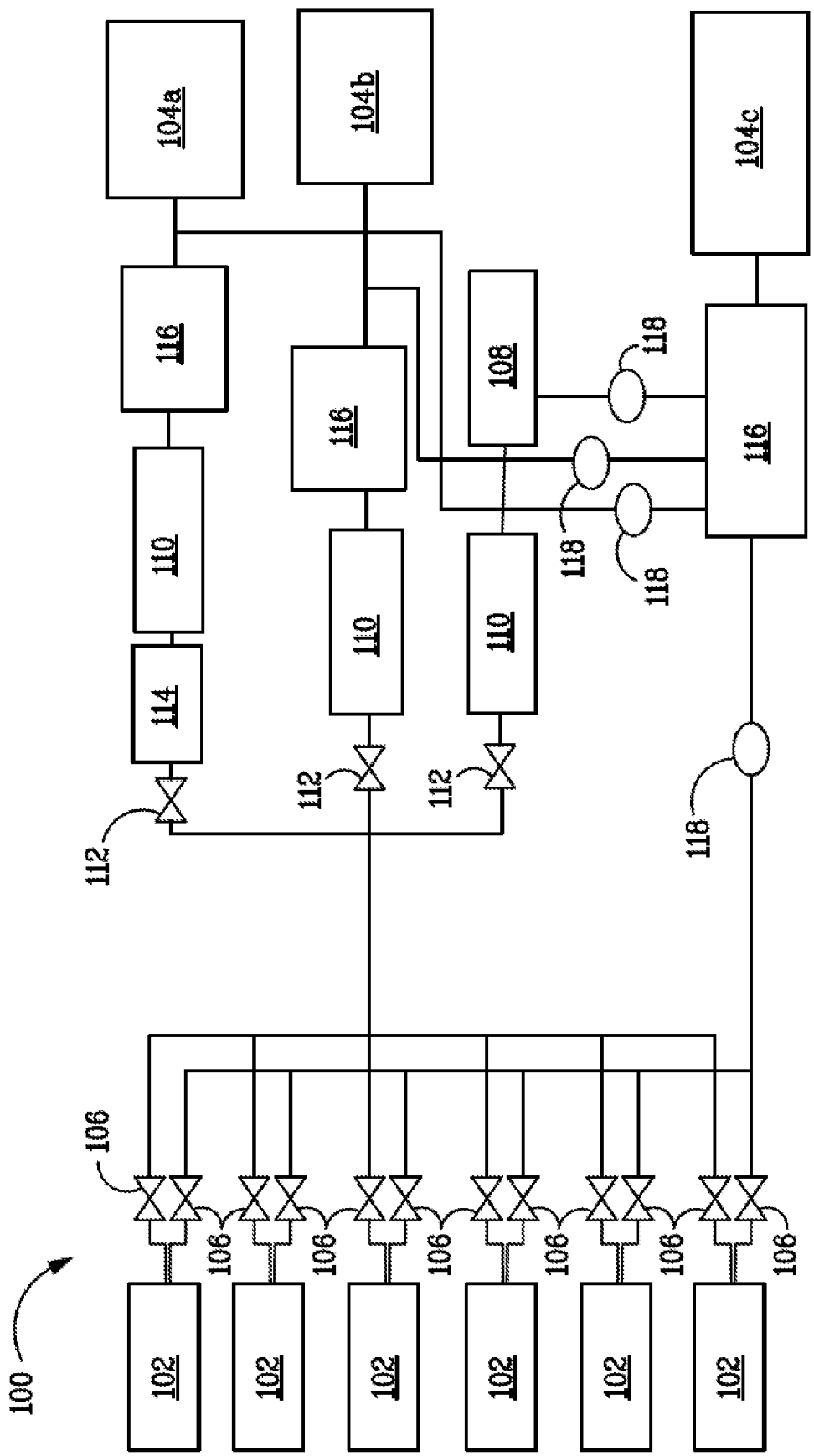

MULTIPLE OUTPUT HEADER

This application claims priority to TW application No. 111121693 entitled "MULTIPLE OUTPUT HEADER", filed Jun. 10, 2022, and also claims priority to U.S. Provisional Application No. 63/211,858 entitled "MULTIPLE OUTPUT HEADER", filed Jun. 17, 2021, the entire contents of which are incorporated herein by reference.

FIELD

The present disclosure is directed to header units for hydrogen generation systems.

BACKGROUND

There is a desire for gas generation installations to supply gas for multiple different applications. For example, a furnace may require hydrogen supplied at low pressure (e.g., 100 psi) while a hydrogen storage unit requires hydrogen supplied at high pressure (e.g., 2500 psi). A single installation must have the proper equipment to supply gas at multiple output pressures. This problem is further complicated if the gas is generated at some middle pressure, such as 400 psi. Continuing these examples, hydrogen generated at 400 psi must be compressed to increase the pressure by 2100 psi to be suitable for storage. Conversely, the hydrogen generated at 400 psi has 300 psi excess pressure required to supply the furnace at 100 psi; thus, the additional 300 psi of excess compression represents wasted energy.

Generally, systems of the prior art have merely accepted the excess compression and energy loss. Some systems solve this problem by dedicating a single gas generator to each end-use application; i.e., one hydrogen generator for the furnace and another hydrogen generator for storage. Other systems direct all generated hydrogen to storage and then route the stored hydrogen to each application, needlessly compressing and decompressing the hydrogen and leading to further energy waste.

What is needed is a system that supplies gas at multiple output pressures without excess wasted energy.

SUMMARY OF THE DISCLOSURE

Provided herein are systems for providing a gas to a plurality of applications having different header pressures. The systems comprise a plurality of gas generators, each gas generator having an output pressure; a plurality of applications fluidly connected to the plurality of gas generators, each of the plurality of applications having a header pressure and at least two of the plurality of applications have different header pressures; and a plurality of header valves, each header valve fluidly connected to one or more of the applications and to one or more of the plurality of gas generators. The plurality of header valves is operable to direct the flow of gas generated by the plurality of gas generators to one or more of the plurality of applications.

In some embodiments, the plurality of gas generators generates a gas selected from the group consisting of hydrogen, oxygen, nitrogen, ammonia, and combinations thereof. In preferred embodiments, the plurality of gas generators generates hydrogen.

In some embodiments, the plurality of gas generators comprises one or more electrolyzers. In some examples, the one or more electrolyzers are proton exchange membrane (PEM) electrolyzers. In other embodiments, the plurality of gas generators comprises one or more steam methane reformers. In some embodiments, the output pressure of each gas generator is less than or equal to the header pressure of each application.

In some embodiments, the system further comprises a pressure expander. In some examples, the pressure expander is a turbine. In some additional examples, the pressure expander is an electrochemical cell.

In some embodiments, the system further comprises at least one compressor.

In some embodiments, the system further comprises a gas storage system.

In some embodiments, the system further comprises one or a plurality of pressure sensors.

In some embodiments, the system further comprises one or a plurality of buffer tanks.

In some embodiments, the system further comprises a controller. In some aspects, the controller is operable to automatically open or close one or more of the a plurality of header valves when a change in one or more header pressures is detected.

Further provided herein is a method for providing a gas to a plurality of applications having different header pressures. The method comprises generating at least one gas via a plurality of gas generators, each gas generator having an output pressure; and opening and/or closing a plurality of header valves to direct the flow of the at least one gas to or away from one or more applications. The output pressure of each gas generator may be less than or equal to the header pressure of each application. In some aspects, the opening and/or closing of the plurality of header valves is performed automatically via a controller.

In some embodiments, the method further comprises determining the header pressure of at least one of the one or more applications.

In some embodiments, the method further comprises determining the output pressure of each of the plurality of gas generators.

In some embodiments, the method further comprises supplying at least one gas stored in a gas storage unit to the one or more applications.

In some embodiments, the plurality of gas generators generates a gas selected from the group consisting of hydrogen, oxygen, nitrogen, ammonia, and combinations thereof. In preferred embodiments, the plurality of gas generators generates hydrogen.

In some embodiments, the plurality of gas generators comprises one or more electrolyzers. In some examples, the one or more electrolyzers are proton exchange membrane (PEM) electrolyzers. In other embodiments, the plurality of gas generators comprises one or more steam methane reformers. In some embodiments, the output pressure of each gas generator is less than or equal to the header pressure of each application.

The method may further comprise purifying the at least one gas. The method may further comprise reducing the pressure of the at least one gas via a pressure expander. The method may further comprise compressing the at least one gas.

BRIEF DESCRIPTION OF THE FIGURES

FIG. 1 is a flow diagram of an exemplary system of the present disclosure.

DETAILED DESCRIPTION

Provided herein is a system for generating gas to be supplied at multiple output pressures. Referring to FIG. 1, the system 100 includes a plurality of gas generators 102, each gas generator 102 having an output pressure. The system further comprises a plurality of applications 104 (numbered 104a, 104b, and 104c), each application 104 being fluidly connected to each of the gas generators 102. Each of the plurality of applications 104 has a header pressure, and at least two of the plurality of applications 104 have different header pressures. The system further comprises a plurality of header valves 106. Each of the header valves 106 is fluidly connected to one or more of the plurality of applications 104 and to one or more of the plurality of gas generators 102. The plurality of header valves 106 is operable to direct the flow of gas generated by the plurality of gas generators 102 to one or more of the plurality of applications 104.

The plurality of gas generators 102 may all produce the same gas; in other embodiments, a first set of gas generators 102 may produce a first gas, a second set of gas generators 102 may produce a second gas, and so on. The gas generators 102 may be any gas generator known in the art, such as an electrolyzer, a steam methane reformer, a fuel cell, a concentrator, etc.

In some embodiments, the plurality of gas generators 102 are operable to generate a gas selected from the group consisting of hydrogen, nitrogen, oxygen, ammonia, and combinations thereof. Methods of generating these gases are generally known and described in the art. For example, methods of generating hydrogen are well described in U.S. application Ser. No. 17/101,232, incorporated by reference herein in its entirety. As another example, methods of generating nitrogen and ammonia are well described in U.S. application Ser. No. 17/101,224, incorporated by reference herein in its entirety.

In an exemplary embodiment, the plurality of gas generators 102 includes proton exchange membrane (PEM) electrolyzers that generate hydrogen. Such PEM electrolyzers are well known and described in the art, including in U.S. application Ser. No. 17/101,232, incorporated by reference herein in its entirety.

The gases generated by each of the plurality of gas generators 102 may have different qualities such as purity, moisture content, temperature, or other parameters as required to support the plurality of applications 104. The system 100 may be operable to combine gases having different qualities (e.g., low moisture content and high moisture content) to achieve an optimal gas delivered to a desired application 104. This further increases efficiency of the system 100: just as excessive compression and expansion reduces efficiency of the facility, excessive purification, drying, heating, etc., also reduces overall efficiency.

Each gas generator 102 has an output pressure. The output pressure of each gas generator 102 may be the same, or each gas generator 102 may have a different output pressure. Differences in output pressure may be due to differences in the type of gas generator (e.g., an electrolyzer and a steam methane reformer may have different output pressures), or the differences may be due to other extraneous factors such as the age and/or efficiency of the gas generator (e.g., an old electrolyzer may have a reduced output pressure as compared to a new electrolyzer). The output pressure of the each gas generator 102 may range from about 1 bar to up to 700 bar, or greater.

The plurality of applications 104 may include any applications that require the gas(es) generated by the plurality of gas generators 102; for example, the plurality of applications may include industrial processes, fuel cells, storage systems, etc. Additional non-limiting examples of applications within the scope of this disclosure include a furnace, a vehicle charging station, a storage installation, a reactor, food and beverage processing, etc. The plurality of applications 104 are fluidly connected to the plurality of gas generators.

Each of the plurality of applications 104 may require one or more gases; alternatively, a subset of the plurality of applications 104 may require a first gas (e.g., hydrogen) and another subset of the plurality of applications 104 may require a second gas (e.g., nitrogen). In such embodiments, these subsets of applications may be segregated by gas type. Stated another way, the subset of applications requiring hydrogen may have a corresponding subset of hydrogen gas generators and corresponding piping and instrumentation that are segregated (either in the entirety or by use of a system of valves) from the subset of applications requiring nitrogen, which also have a corresponding subset of nitrogen gas generators and corresponding piping and instrumentation.

The system 100 further comprises a plurality of header valves 106. Each header valve 106 is fluidly connected to one or more of the applications and to one or more of the plurality of gas generators. The header valves 106 are operable to allow or cut off flow of the gas generated from the one or more gas generators to one or more of the plurality of applications. The plurality of header valves 106 may each be any valve known in the art.

The system 100 may also comprise a plurality of isolation valves 112. The isolation valves 112 are operable to isolate the plurality of applications from the system; i.e., the isolation valves 112 may shut off the flow of gas to one or more of the plurality of applications. This is helpful to optimize safety of the system in the event of a gas leak or other malfunction, and may be beneficial during maintenance and/or repair of the isolated applications. The plurality of isolation valves 112 may each be any valve known in the art.

The system 100 may further comprise a buffer tank or a plurality of buffer tanks 116. The buffer tanks 116 are operable to temporarily store gas generated by the plurality of gas generators 102 before the gas moves to one of the plurality of applications 104. The buffer tanks 116 may store the gas at a pressure higher than the header pressure of the application. At times when the demand for gas by the application increases beyond normal capacity, the buffer tank may allow more gas to flow to the application as compared to normal operation. The buffer tanks 116 may be any buffer tanks known in the art suitable for storing a gas. Methods for procuring, designing, and constructing buffer tanks are also known in the art. The buffer tanks 116 may include valves operable to open and direct gas into one or more of the plurality of applications 104.

The system 100 may further comprise one or more compressors 110. The compressor 110 is operable to balance the flow between low and high pressures. Although the purpose of the system is to minimize the amount of compression needed to provide gas to the plurality of applications 104, it is acknowledged that further compression may still be necessary. The energy required to compress the gas is minimized by use of the system 100 described herein. The compressors 110 may be any compressors known in the art for compressing a gas. In preferred embodiments, compressors 110 may be diaphragm compressor, a piston compressor, a turbo-compressor, or an electrochemical hydrogen pump pumping from low pressure to high pressure. Methods for procuring, designing, and constructing compressors are also known in the art.

The system 100 may further comprise one or a plurality of gas pressure sensors 118. The gas pressure sensors 118 are operable to determine the pressure of the gas in the system 100 at a given location. The gas pressure sensors 118 may also be coupled with an alarm to signal when gas pressure rapidly increases or decreases or increases or decreases beyond a predetermined set point. Thus by determining the gas pressure at a given location, optimal operation of the system 100 and safety are improved. The gas pressure sensors 118 may each be any gas pressure sensors known in the art. Methods for procuring, designing, and constructing gas pressure sensors are also known in the art. The pressure sensors may be operably configured to detect and/or confirm that the system effectively supplies gas to a plurality of applications at different output pressures.

The system 100 may further comprise one or more storage units 108. Generally, the storage unit 108 stores the gas at a pressure higher than the header pressures of the plurality of applications 104. The storage unit 108 includes valves that are operable to deliver stored gas to the plurality of applications or to any other location in the system 100. Thus, the storage unit 108 may be able to provide gas to the plurality of applications 104 if one or more of the gas generators 102 shuts down or malfunctions. The storage units 108 may be any devices or systems known in the art suitable for storage of a gas.

The system 100 may further comprise one or more pressure expander. As used herein, pressure expanders are systems or devices used to reduce the pressure in a system. Pressure expanders for use in the system 100 of the present disclosure include turbines, turbo-compressors, and electrochemical cells with hydrogen pumping from high pressure to low pressure. In some embodiments, energy from the pressure expander may be recovered as electricity. Methods of energy recovery from pressure expanders is well-known and described in the art.

In particular embodiments, an electrochemical pump or a turbo-compressor may act as either a compressor or a pressure expander.

The system 100 may further comprise a self-powering mixed conductor device to manage pressure between high and low pressure states with flow in either direction. Self-powering mixed conductor devices are known in the art and are capable of delivering pure gaseous products without an external electrical power source. In some examples, the self-powering mixed conductor may include ceramic membranes (e.g., ceramic oxides, strontium cerate oxides, perovskites, etc.) with conductors for hydrogen separation and production.

The system 100 may further comprise a controller. The controller may be in electrical communication with at least one or more of the plurality of gas generators 102 and/or the plurality of applications 104. In general, the controller may include one or more processors and a non-transitory computer-readable storage medium having stored thereon instructions for causing the one or more processors to control one or more of startup, operation, or shutdown of any one or more of the various aspects of the system 100 to facilitate safe and efficient operation. For example, the controller may interrupt power to any of the plurality of applications in the event an anomalous condition is detected. The controller may also be operable to automatically open or close valves or adjust other system parameters to ensure safe and efficient operation of the system 100. As an example, the controller may be operable to automatically open or close one or more of the plurality of header valves when a change in one or more header pressures is detected.

In some embodiments, one or more of the applications 104 may require a user to select a desired outlet pressure or a plurality of desired outlet pressures. The desired outlet pressure may comprise a first outlet pressure, second outlet pressure, third outlet pressure, fourth outlet pressure, fifth outlet pressure, n-th outlet pressure (where n is a positive integer), and combinations thereof. For example, if the application is a hydrogen fuel cell refueling station for hydrogen fuel cell vehicles, the user may select a pressure sufficient to refuel their vehicle (e.g., between 350 bar and 700 bar). In such embodiments, the controller may automatically adjust the appropriate valves and instruments to deliver the desired outlet pressure in response to the user's input. Thus, different and/or multiple output pressures may be delivered from a single application. In another embodiment, the controller may automatically adjust the appropriate valves and instruments to deliver a plurality of outlet pressures in response to the user's input, wherein the plurality of output pressures correspond to different applications. Similarly, in another embodiment, the controller may automatically adjust the appropriate valves and instruments to deliver at least a first outlet pressure and a second outlet pressure in response to the user's input, wherein the first outlet pressure and second outlet pressure correspond to different applications.

The system 100 may further comprise a purifier 114. The purifier may be operable to remove impurities (e.g., water) from the gas prior to delivery to an application 104 or other process unit. Any purifier known in the art for gas purification may be used.

The system 100 may further comprise a heat exchanger to add or remove heat from the gas before delivery to the application 104. The heat exchanger may be any heat exchanger known in the art, such as a shell and tube heat exchanger, a plate heat exchanger, a plate and shell heat exchanger, an adiabatic wheel heat exchanger, a plate fin heat exchanger, a finned tube heat exchanger, a pillow plate heat exchanger, or any other heat exchanger known in the art. Methods for procuring, designing, and constructing heat exchangers are also well known in the art.

The system 100 may further comprise a gas blending system to mix gases prior to delivery to one or more applications 104. The gas blending system may mix two or more gases produced in the plurality of gas generators 102, or the gas blending system may mix air or another gas supplied to the gas blending system. Gas blending systems and methods for procuring, designing, and constructing gas blending systems are generally well known in the art.

The system 100 may further comprise purge systems. The purge system is fluidly connected with the system 100 and may be operable to deliver a purge gas to the system 100 to remove any gas or impurities from the system. The purge systems thus can ensure safety before, during, and after startup or maintenance of the system or any of its components, particularly when working with flammable or explosive gases. In some embodiments, the purge gas may comprise a noble gas, such as argon or helium. In other embodiments, the purge gas may comprise an inert gas, such as nitrogen. In other embodiments, the purge system may comprise no purge gas at all; rather, the purge system comprises a vacuum reservoir that pulls gas from the system into the reservoir when activated.

The system 100 may further comprise exhaust gas recirculation. The exhaust gases from the plurality of applications 104 may be circulated back into the system 100 at any location. The exhaust gases may comprise the same gas that was provided to the application or may comprise a different gas or gases (e.g., combustion products). The exhaust gases may have a pressure the same as or different from the header pressure of the application 104. Prior to recirculation back into the system 100, the exhaust gases may be compressed, expanded, purified, etc. as required by the plurality of applications; or the exhaust gases from one or more applications 104 may be recirculated directly into the same or another application(s).

Other process units may be added to the system as required by either the gas generation system employed or as required by the application.

Further provided herein are methods for delivering gas to a plurality of applications having different header pressures. The method comprises generating at least one gas via a plurality of gas generators, each gas generator having an output pressure; and opening and/or closing a plurality of header valves to direct the flow of the at least one gas to or away from one or more applications, each application having a header pressure. The output pressure of each gas generator may be less than or equal to the header pressure of one or more applications. In some examples, the output pressure of each gas generator is less than or equal to the header pressure each of the applications.

The method may further comprise determining the header pressure of at least one of the one or more applications. The determining may be accomplished by using a gas pressure sensor described above. The determining may be accomplished by a person or by a computer; preferably, the determining is accomplished by a computer. Systems and devices for determining a gas pressure are generally known in the art.

The method may further comprise determining the output pressure of each of the plurality of gas generators. The determining may be accomplished by using a gas pressure sensor described above. The determining may be accomplished by a person or by a computer; preferably, the determining is accomplished by a computer. Systems and devices for determining a gas pressure are generally known in the art.

As discussed above, the opening and/or closing of the plurality of header valves may be accomplished automatically via the controller. For example, if the header pressure of an application is determined to be lower than the output pressure of one or more gas generators providing gas to the application, then the controller may open and close one or more header valves to divert more gas to the application to meet the application's demand.

The method may further comprise supplying at least one gas stored in a gas storage unit to the one or more applications. This is especially useful at times of peak demand or when one or more gas generators has been shut down or malfunctions and more gas generation capacity is needed.

The method may further comprise purifying the gas via a purifier. Any purifier known in the art and/or described herein may be used to purify the gas.

The method may further comprise compressing the gas. The gas may be compressed via any compressor known in the art and/or described herein; for example, the gas may be compressed via a diaphragm compressor, a piston compressor, a turbo-compressor, or an electrochemical hydrogen pump pumping from low pressure to high pressure.

The method may further comprise expanding the gas. The gas may be expanded via any pressure expander known in the art and/or described herein. For example, the pressure expander may comprise a turbine, turbo-compressor, or an electrochemical cell with hydrogen pumping from high pressure to low pressure. Furthermore, the method may comprise recovering electricity from the pressure expander.

The invention claimed is:

1. A system comprising:
   a plurality of gas generators, each gas generator having an output pressure;
   a plurality of applications fluidly connected to the plurality of gas generators, each of the plurality of applications having a header pressure and at least two of the plurality of applications having different header pressures; and
   a plurality of header valves, each header valve fluidly connected to one or more of the plurality of applications and to one or more of the plurality of gas generators,
   wherein two or more of the plurality of header valves combine the flow of gas from two or more of the plurality of gas generators to form a first header, and at least one header valve and at least one gas generator forms a second header,
   wherein the plurality of header valves is operable to change the flow of gas generated by the plurality of gas generators to the first header or the second header,
   wherein the first header is fluidly connected to at least one application and the second header is fluidly connected to at least one application with the proviso that the first header and the second header are not fluidly connected to the same application, and
   wherein the output pressure of each gas generator is less than or equal to the header pressure of each application.

2. The system of claim 1, wherein the plurality of gas generators generates a gas selected from the group consisting of hydrogen, oxygen, nitrogen, ammonia, and combinations thereof.

3. The system of claim 1, further wherein the system supplies gas to the plurality of applications at a plurality of output pressures.

4. The system of claim 1, wherein the plurality of gas generators comprises one or more steam methane reformers.

5. The system of claim 1, further comprising at least one compressor fluidly connected to the plurality of gas generators and to the plurality of applications.

6. The system of claim 1, further comprising a gas storage system fluidly connected to the plurality of gas generators and to the plurality of applications.

7. The system of claim 1, further comprising a plurality of pressure sensors.

8. The system of claim 1, further comprising a buffer tank fluidly connected to the plurality of gas generators and to the plurality of applications.

9. The system of claim 1, further comprising a controller.

10. The system of claim 9, wherein the controller is operable to automatically open or close one or more of the plurality of header valves when a change in one or more header pressures is detected.

11. The system of claim 1, wherein the plurality of gas generators comprises one or more electrolyzers.

12. The system of claim 11, wherein the one or more electrolyzers are proton exchange membrane (PEM) electrolyzers.

13. The system of claim 12, wherein the PEM electrolyzers generate hydrogen.

14. The system of claim 1, further comprising a pressure expander fluidly connected to the plurality of gas generators and to the plurality of applications.

15. The system of claim 14, wherein the pressure expander is a turbine.

16. The system of claim 14, wherein the pressure expander is an electrochemical cell.

17. A method comprising:
generating at least one gas via a plurality of gas generators, each gas generator having an output pressure;
opening and/or closing a plurality of header valves to direct the flow of the at least one gas to or away from one or more applications, each application having a header pressure,
wherein two or more of the plurality of header valves combine the flow of gas from two or more of the plurality of gas generators to form a first header, and at least one header valve and at least one gas generator forms a second header, and
wherein the first header is fluidly connected to at least one application and the second header is fluidly connected to at least one application with the proviso that the first header and the second header are not fluidly connected to the same application.

18. The method of claim 17, further comprising determining the header pressure of at least one of the one or more applications.

19. The method of claim 17, further comprising determining the output pressure of each of the plurality of gas generators.

20. The method of claim 17, wherein the output pressure of each gas generator is less than or equal to the header pressure of each application.

21. The method of claim 17, wherein the opening and/or closing of the plurality of header valves is performed automatically via a controller.

22. The method of claim 17, further comprising supplying at least one gas stored in a gas storage unit to the one or more applications.

23. The system of claim 1, further comprising a plurality of isolation valves, each isolation valve fluidly connected to one of the applications in the plurality of applications and fluidly connected to one of the header valves in the plurality of header valves.

* * * * *